UNITED STATES PATENT OFFICE.

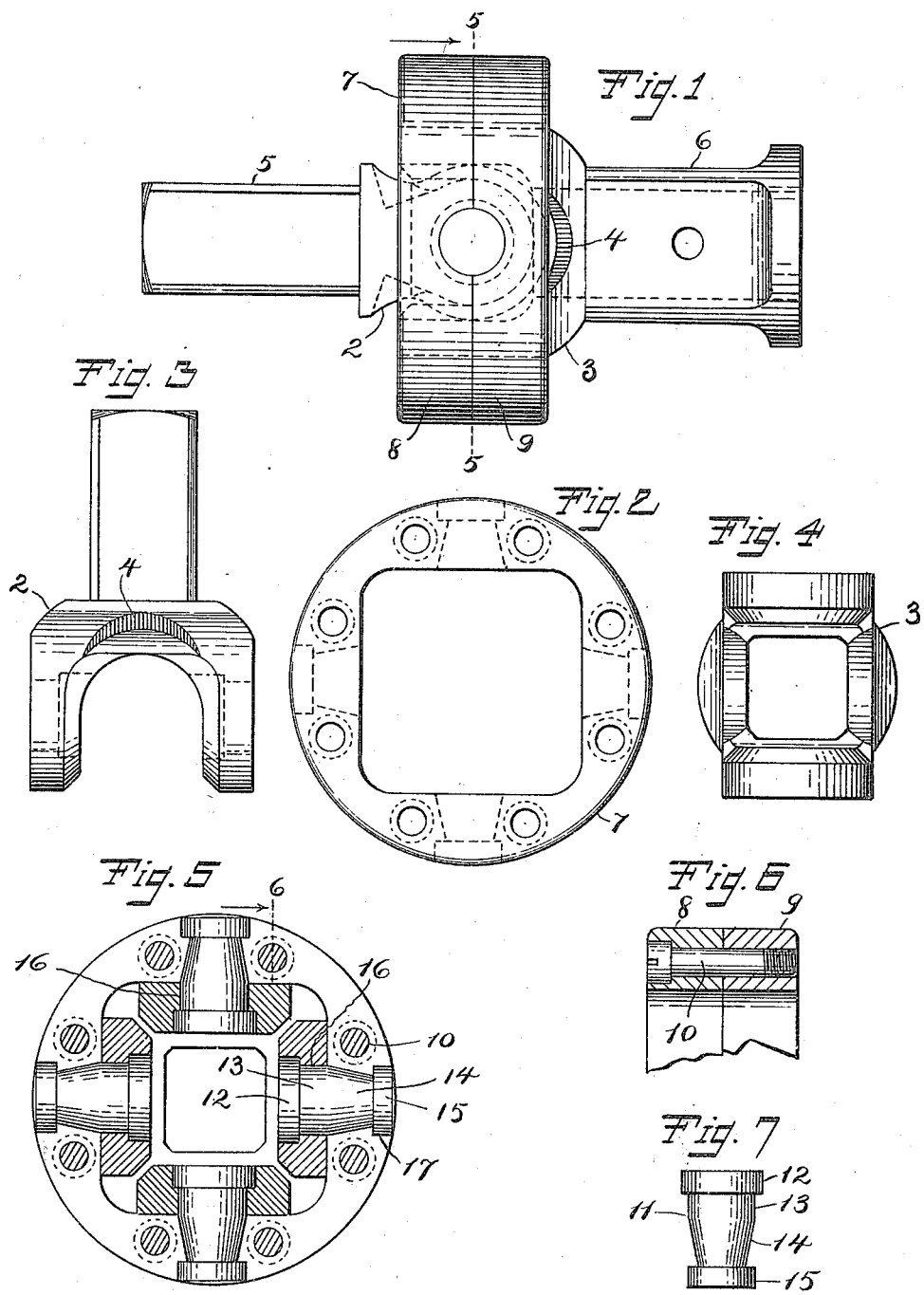

CHARLES W. SPONSEL, OF HARTFORD, CONNECTICUT, ASSIGNOR, BY DIRECT AND MESNE ASSIGNMENTS, TO THE AJAX UNIVERSAL JOINT COMPANY, OF HARTFORD, CONNECTICUT, A CORPORATION OF CONNECTICUT.

UNIVERSAL JOINT.

1,162,885.      Specification of Letters Patent.      Patented Dec. 7, 1915.

Application filed August 28, 1914. Serial No. 859,041.

*To all whom it may concern:*

Be it known that I, CHARLES W. SPONSEL, a citizen of the United States, residing at Hartford, in the county of Hartford and State of Connecticut, have invented certain new and useful Improvements in Universal Joints, of which the following is a specification.

This invention relates to universal joints. In my contemporaneously pending application, filed August 12, 1914, Serial No. 856,335, I have shown, described and claimed a novel form of joint. The present joint has all the advantages possessed by that disclosed by said application, the advantages, however, being attained by different means.

In the drawings accompanying and forming part of the present specification I have shown in detail one convenient form of embodiment of the invention which to enable those skilled in the art to practice the same will be set forth fully in the following description. I do not restrict myself, however, to this particular disclosure; I may depart therefrom in several respects within the scope of the invention defined by the claims following said description.

Referring to said drawings: Figure 1 is a side elevation of a joint involving my invention. Fig. 2 is a view in elevation of the coupling-member as seen from the right or left in Fig. 1. Fig. 3 is a side view of the forked member on the left in Fig. 1. Fig. 4 is an inside face view of the forked member on the right in said Fig. 1. Fig. 5 in a sectional view on the line 5—5 of Fig. 1, looking in the direction of the arrow. Fig. 6 is a detail view in section on the line 6 of Fig. 5. Fig. 7 is a detail view of a stud.

Like characters refer to like parts throughout the several figures of the drawings.

The joint involves in its organization two forked members as 2 and 3 which are interfitted as common in universal joints and the crotch portions of which are relieved as at 4 by milling or otherwise, on opposite sides thereof to provide for the maximum relative universal movement of said forked members 2 and 3. It is usual to provide these forked members 2 and 3 with shanks of suitable kind such for example as 5 and 6 respectively and which may be shaped to connect with shafts or otherwise as may be desired, this, however, being an immaterial point and not of my invention.

In conjunction with forked members as 2 and 3 or their equivalents, is a coupling member which may be of any suitable construction and related with the forked members in any desirable manner. A coupling member such as that denoted in a general way by 7 answers my conditions, this coupling member as illustrated consisting of duplicate, superimposed sections as 8 and 9 suitably rigidly connected together. For this purpose I have shown the screws 10 which may as shown pass freely through openings in the section 8 and be tapped into openings in the section 9, the section 8 having as shown, counterbores to receive the heads of the connecting screws 10 of which there may be any desired number. This coupling-member 7 is shown as a ring and as surrounding the interfitted forks 2 and 3, there being studs arranged in diametrically opposite pairs, for connecting the coupling member with the forks 2 and 3 in such manner as to permit relative universal movement of said forks. The studs each denoted in a general way by 11 answer satisfactorily in this connection, each stud as illustrated having an inner head 12, body portion 13, a pivot portion 14 (shown as tapered) and an outer head 15, the two longitudinally-separated heads 12 and 15 of the studs presenting suitable abutments and bearing for this purpose respectively against the branches of the forks 2 and 3 and coupling member 7 to prevent longitudinal movement of said studs 11 in opposite directions. As illustrated the branches of the respective forks 2 and 3 have holes 16 therethrough, each hole 16 being of two diameters to agree respectively with the diameters of the bodies 13 and heads 12. The smaller diametrical portions of the holes 16 receive the body portions 13 of the studs 11 while the heads 12 are fitted in the larger diametrical portions of said holes 16 which present counterbores for said heads. These pins or studs 11 are preferably but not essentially, driven into the holes 16 from inside the branches of the two forks. The sections of the coupling member or ring 7 have on their flat abutting faces recesses or notches 17, each notch comprising an outer semi-cylindrical portion and an inner semi-frusto-conical or tapered portion. When the recesses or notches 17 of the two sections register or coincide the coupling member 7 will have four bearing holes arranged in pairs at approximately right angles to each other, each bearing hole having an inner tapered portion to receive the tapered pivot portion 14 of a stud 11 and an outer cylindrical portion to receive the head 15 of said stud.

It becomes an easy matter to assemble the parts of the joint. Initially the studs 11 are driven through the holes 16 in the branches of the two forks 2 and 3 from the inside thereof so that the heads 12 of said studs will fit solidly and substantially in the counterbored portions of the holes. As a matter of fact the studs are held non-rotatively in position in the forks by a driving fit. There may be cases such as shown in my other application where I might not rely altogether on the tight fit of the studs in place to prevent their rotation but could as in said application utilize extraneous means to insure this end. After the studs are mounted in place the section 8 of the ring 7 is slipped over the fork 2, the section 9 being slipped over the fork 3. The two forks are then interfitted, and the sections of the ring 7 brought together so that the recesses therein mate and receive the projecting pivot and headed portions of the two pairs of studs 11 following which the screws 10 are introduced.

What I claim is:

1. A universal joint comprising two forked members, and an annular coupling member surrounding the forked members, and two pairs of studs for pivotally connecting the coupling member and forked members to permit relative universal movement of said forked members, the studs being arranged in diametrically opposite pairs and the coupling members and forks having openings to receive the studs, each stud having longitudinally separated heads, one of which has a bearing engagement against a branch of the fork of a forked member and the other of which has a bearing against the coupling member to prevent longitudinal movement in opposite directions thereof, said coupling member consisting of a sectional ring surrounding the forked members, the stud-receiving openings of the ring being composed of mating recesses in the sections of said ring, the inner heads of said studs being of greater diameter than the outer heads thereof.

2. A universal joint comprising two forked members, the forks of which are interfitted and at approximately right angles to each other, the branches of the respective forks having openings, studs driven through said openings from the inner sides of the forks, and a coupling ring surrounding said forked members, formed in sections and having recesses which mate to form bearing openings, the outer portions of the studs being rotative in said bearing openings and having heads bearing against the outer portion of the ring and also having heads bearing against the forks to prevent endwise movement in opposite directions of said studs, the inner heads being of greater size than the outer heads.

3. A universal joint comprising two forked members, the forks of which are interfitted and at approximately right angles to each other, the branches of the respective forks having openings, studs passed through said openings, and a coupling ring in sections having recesses which mate to form openings to receive the studs, each stud having longitudinally separated heads, the inner heads being countersunk in the respective forked members and the outer heads being countersunk in the ring to prevent longitudinal movement in opposite directions of said studs.

4. A universal joint comprising two forked members and an annular coupling member surrounding the forked members, and two pairs of transversely disposed studs for pivotally connecting the coupling member and the forked members to permit relative universal movement of said forked members, the studs having longitudinally separated heads, the inner heads being of greater size than the outer heads and the branches of the forks having openings sized to permit the passage of the studs therethrough from inside the forks and to prevent the movement of the studs entirely through said openings.

In testimony whereof I affix my signature in presence of two witnesses.

CHARLES W. SPONSEL.

Witnesses:
HEATH SUTHERLAND,
L. L. MARKEL.

Copies of this patent may be obtained for five cents each, by addressing the "Commissioner of Patents, Washington, D. C."